US006352370B1

(12) United States Patent
Nicot

(10) Patent No.: US 6,352,370 B1
(45) Date of Patent: Mar. 5, 2002

(54) BEARING WITH BUILT-IN ENCODER

(75) Inventor: Christophe Nicot, Prairie (FR)

(73) Assignee: The Torrington Company, Torrington, CT (US)

(*) Notice: Subject to any disclaimer, the term of this patent is extended or adjusted under 35 U.S.C. 154(b) by 0 days.

(21) Appl. No.: 09/545,074

(22) Filed: Apr. 7, 2000

(30) Foreign Application Priority Data

Apr. 14, 1999 (FR) .............................. 99 04671

(51) Int. Cl.⁷ .............................................. F16C 19/00
(52) U.S. Cl. ...................................................... 384/448
(58) Field of Search ................................. 384/448, 538, 384/539, 537; 324/207.25, 173, 174; 310/168

(56) References Cited

U.S. PATENT DOCUMENTS

| | | | | |
|---|---|---|---|---|
| 3,616,687 A | * | 11/1971 | Wignall ................... 324/174 X |
| 4,988,219 A | * | 1/1991 | Peilloud ...................... 384/448 |
| 5,240,333 A | * | 8/1993 | Hassiotis et al. ............ 384/448 |
| 5,293,787 A | * | 3/1994 | Paul et al. ............... 384/448 X |
| 5,755,517 A | * | 5/1998 | Nicot .......................... 384/448 |
| 5,927,867 A | * | 7/1999 | Niebling et al. ............. 384/539 |

FOREIGN PATENT DOCUMENTS

| | | |
|---|---|---|
| DE | 93 07 156.6 | 7/1993 |
| DE | 42 28 988 A1 | 3/1994 |
| DE | 91 17 193 U1 | 11/1997 |
| EP | 0 250 275 A1 | 12/1987 |
| EP | 0 326 454 A1 | 1/1989 |
| EP | 0 395 892 A1 | 6/1990 |
| EP | 0 453 331 A1 | 10/1991 |

* cited by examiner

Primary Examiner—Thomas R. Hannon
(74) Attorney, Agent, or Firm—John C. Bigler

(57) ABSTRACT

Bearing (1) with a built-in encoder (22) that comprises a fixed ring (2), a rotating ring (3) designed to be mounted on a rotating body (5), and rolling components (4) between them. A frame (13) forms, on the one hand, support for an annular encoder (22) to generate electromagnetic impulses and, on the other hand, a device for rigidly connecting the rotating body (5) and the rotating ring (3). The rotating ring (3) fits onto the connection device, which is designed to be inserted between the rotating body (5) and the rotating ring (3). Sensor (29) and steering system components may be added.

26 Claims, 4 Drawing Sheets

BEARING WITH BUILT-IN ENCODER

BACKGROUND OF THE INVENTION

This invention relates generally to the field of bearings with instruments and, more particularly, to bearings with a built-in encoder, where the encoder is an annular component that generates electromagnetic impulses. It also concerns an assembly an comprising such a bearing, and a sensor, where the sensor is a device to detect impulses generated by the encoder, and a vehicle steering system including such a bearing or assembly.

Such bearings are designed to permit, on the one hand, the rotation of a rotating body in relation to a fixed body and, on the other hand, the detection of angular position or speed or a function of such factors. When applied to a vehicle steering system, the system generally includes a steering shaft mounted to rotate in a steering column, as well as a rack and pinion gearbox, the column and the gearbox being fixed in rotation in relation to the chassis of the vehicle. The bearing or assembly may be inserted between the shaft and the column, or even between the shaft and the gearbox.

There already exist known bearings of the type that include a fixed ring, a rotating ring, and rolling elements between them, and in which an encoder is incorporated. In most embodiments, the bearing includes watertight means, the latter being used to support the encoder. For example, document FR 2,717,266, issued to the applicant, describes a device to detect the rotating speed of a roller bearing, which has an encoder component that forms part of the rotating part of the bearing. In that device, the encoder component is combined with the watertight gasket of the bearing.

For some applications, watertight means are not required, and the axial length of the bearing must be limited, the limitation on the size of the bearing thus constituting a constraint on a bulky design. Among such applications, one corresponds to a rack and pinion gearbox of a vehicle steering system. Document EP 856,720 describes an angular steering lock sensor for a steering system, the sensor including a magnet placed on the end of the steering shaft near which the stationary sensor is located.

In that case, the proposed structure, which permits an angular position to be read, is entirely different from those structures proposing integration of an encoder in a bearing. As a result, that embodiment has a number of disadvantages. On the one hand, it requires revision of the sensor support design, for example, the rack and pinion, in order to free the space needed to insert the sensor. On the other hand, the positioning of the sensor on the end of the shaft exposes it to attack from its surroundings, such as splattering from dust, gravel, or mud.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a bearing with a built-in encoder comprising a fixed ring, a rotating ring designed to be mounted on a rotating body, and rolling components between the fixed ring and the rotating ring. A frame forms, on the one hand, a support for an encoder and, on the other hand, a rigid connecting means between the rotating body and the rotating ring, the rotating ring fitting onto the connecting means, which is designed to be inserted between the rotating body and the rotating ring. The encoder is in the form of an annular means to generate electromagnetic impulses.

The foregoing and other aspects will become apparent from the following detailed description of the invention when considered in conjunction with the accompanying drawing figures.

BRIEF DESCRIPTION OF THE DRAWING FIGURES

Represented in the figures is lengthwise axis X that roughly constitutes the axis of rotation of the bearing. The terms "axial," "lengthwise," "front," and "back" are defined in relation to that axis. A radial or crosswise direction is defined on a plane perpendicular to lengthwise axis X. An "inner" location is situated near axis X, while an "outer" location is situated at a distance from axis X.

DETAILED DESCRIPTION

Figure 1:
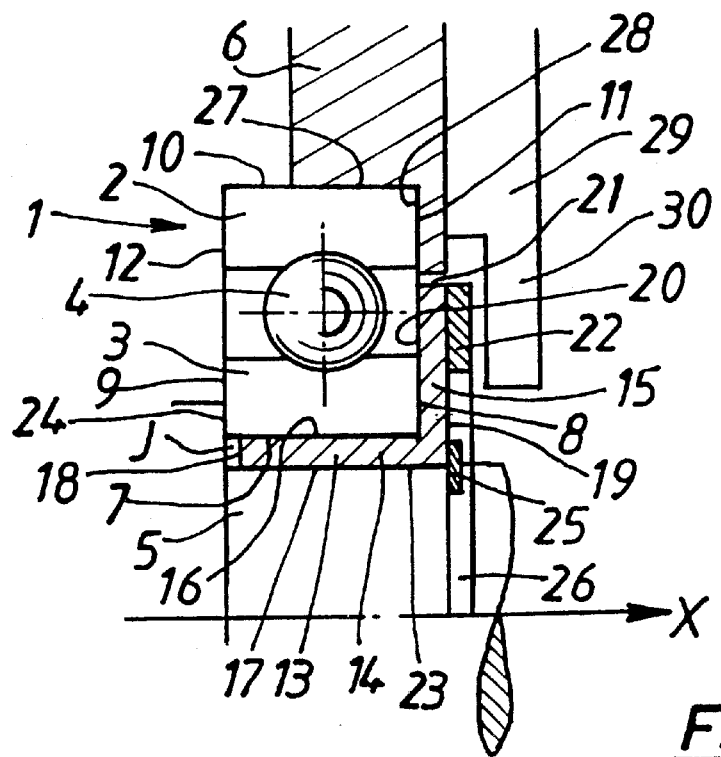
FIG. 1 is a partial cross section of a bearing according to the invention.

Referring now to the drawings, FIG. 1 illustrates bearing 1, that includes fixed ring 2, rotating ring 3, and rolling elements 4 positioned between them. Bearing 1 is designed to be inserted between rotating body 5 and fixed body 6 to permit rotation of rotating body 5 in relation to fixed body 6.

In the case of a shaft driven in rotation in relation to a casing, "shaft" 6 is referred to as the rotating body and "casing" 7 is referred to as the fixed body for greater convenience. Rotating ring 3 of the bearing is then inner ring 3, and fixed ring 2 is outer ring 2, this configuration being the one chosen for this description. However, the invention also applies in the inverse case, where the inner ring of the bearing is fixed and the outer ring turns.

In a conventional manner, inner ring 3 has boring 7 and two side faces, respectively front 8 and back 9, while outer ring 2 has outer surface 10 and two side faces, front 11 and back 12 respectively. Inner ring 3 of the bearing is connected to rigid monoblock frame 13 comprising cylindrical axial section 14 and annular radial section 15 that projects outward, the cross section of this frame being generally L-shaped. Axial section 14 comprises outer face 16, inner face 17, and open axial end 18, while radial section 15 comprises front wall 19 and back wall 20, as well as open circumference 21. The frame 13 is made preferably of a ferromagnetic material by tooling or stamping.

An annular encoder 22 is attached to front wall 19 of radial section 15 of frame 13, and extends radially against the latter. Such an encoder 22 may be made of a synthetic material such as a polymer or elastomer charged with particles of ferrite. The encoder 22 may be attached to frame 13 by gluing or casting into a working mold. In one mode of embodiment, encoder 22 has a plurality of contiguous fields, each field having an inverted polarity in relation to the two fields contiguous to it. The embodiment of such an encoder 22 is itself known and will not be described in further detail herein.

Attaching inner ring 3 to frame 13 involves a step of forcing inner ring 3 of bearing 1 onto axial section 14 of the frame so that boring 7 of inner ring 3 cooperates with outer face 16 of axial section 14. In order to prevent inner ring 3 from becoming disconnected from frame 13 during use, the attachment may further include a crimping step that consists of bending axial end 18 of frame 13 outward at several points, for example at three points 120° apart from one another. In other modes of embodiment, inner ring 3 and frame 13 may be glued, welded, ratcheted, or attached by comparable means.

When inner ring 3 is fitted onto axial section 14 of frame 13, front face 8 of inner ring 3 rests against back wall 20 of radial section 15. Axial end 18 of axial section 14 is then recessed in relation to back face 9 of inner ring 3. There is thus a play J defined between axial end 18 of axial section 14 and rear face 9 of inner ring 3. One advantage of this inserted attachment is that it permits rectification of the manufactured conicity of radial section 15 of frame 13, and thereby ensures a roughly planar rotation of encoder 22 during use, and in all circumstances.

Bearing 1 is mounted on shaft 5 as follows: Frame 13 is fitted onto outer surface 23 of the shaft so that the inner face 17 of axial section 14 of frame 13 and outer surface 23 of shaft 5 cooperate, and that the back face 9 of inner ring 3 rests against shoulder 24 of shaft 5. This support is possible due to the presence of play J between the axial end 18 of axial section 14 and the back face 9 of inner ring 3. Stop ring 25, such as a circlip, is then inserted in groove 26 provided in shaft 5, said stop ring 25 being in contact with front wall 19 of radial section 15 of frame 13, and keeping the latter in a fixed position on shaft 5.

The assembly comprising shaft 5 and bearing 1 is then inserted in casing 6, outer ring 2 fitting into receptacle 27 so as to roughly match it, front face 11 of outer ring 2 then resting against radial support face 28 of receptacle 27. Finally, sensor 29 is attached to casing 6 by screws, ratcheting, or the like, reading component 30 of sensor 29 being positioned opposite encoder 22. At least one, and for example a number of reading elements, are provided in reading component 30, these elements being able to read the electromagnetic impulses emitted by encoder 22.

Sensor 29 transmits the data emitted by this reading to signal processing means in order to deduce the angular position of encoder 22, and from that, of inner ring 3 of bearing 1 in relation to outer ring 2, or its angular speed, or even a function of the angular position or angular speed. The mode of embodiment just described may be applied alone or in combination with one of the variants to be described below.

In a mode of embodiment illustrated in FIGS. 3 to 6, cylindrical ring 31 is provided, made of a rigid or semirigid material such as a metal or polymer, of which at least back end 32 is fitted onto outer ring 2. The ring 31 includes front end 33 designed to rest against sensor 29 when the latter is attached to casing 6. This support permits reading component 30 of sensor 29 to be kept at a predetermined desired distance from encoder 22. Such distance is referred to as the gap. In addition, ring 31 may include, near its extreme front section 33, lip 34 that projects radially outward from ring 31, this lip 34 matching with claw 35 provided in sensor 29, and engaging with it. Thus, when sensor 29 is mounted on casing 6, sensor 29 is ratcheted to ring 31 by means of lip 34 and claw 35, which permits the gap to remain constant during use.

Figure 2:
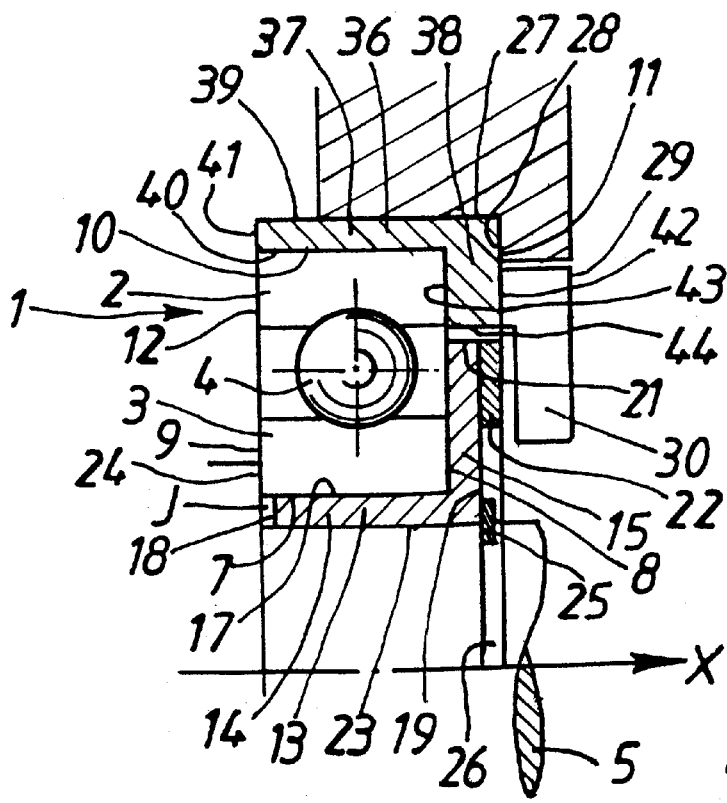
FIG. 2 is a view similar to FIG. 1 of a mode of embodiment that is provided with a second frame.
Figure 3:
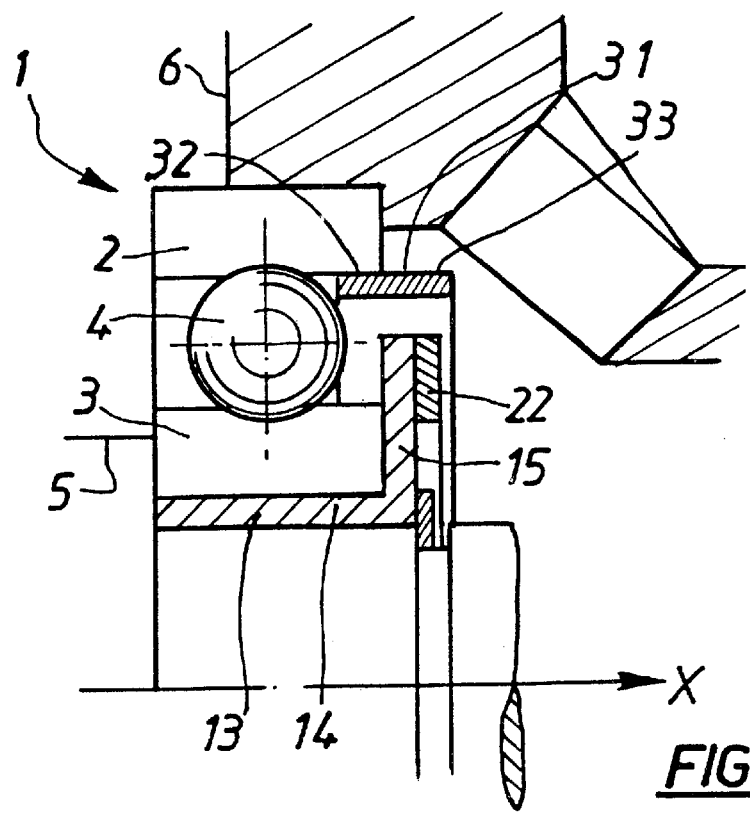
FIG. 3 is a view similar to the above figures of another mode of embodiment, which is provided with a ring forming a support means for a sensor.
Figure 4:
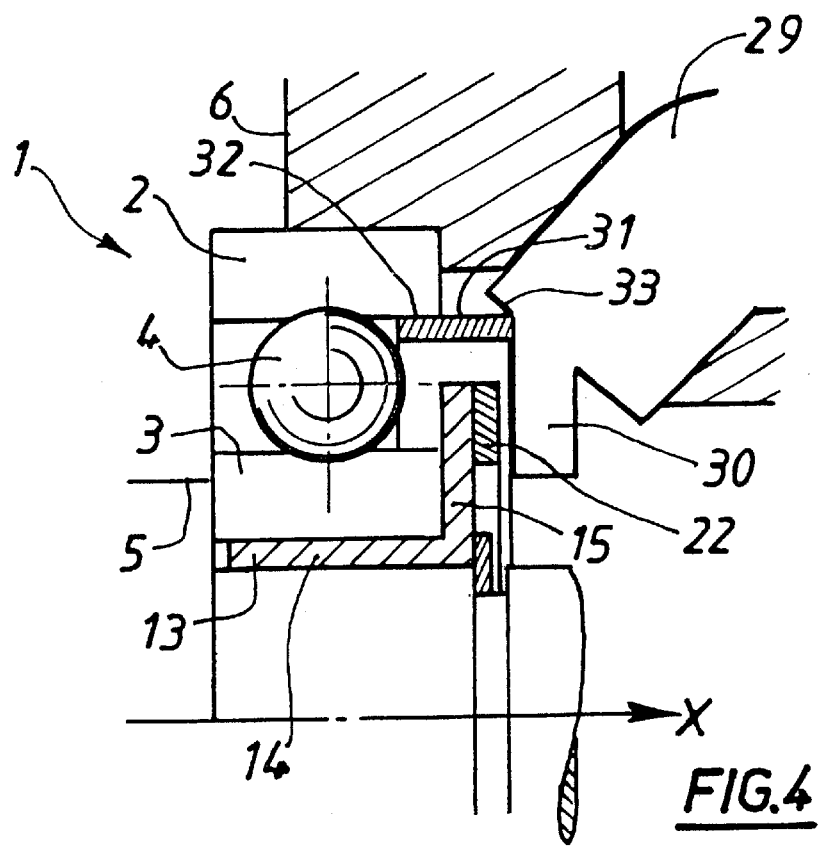
FIG. 4 is a view similar to FIG. 3, where the sensor is represented.
Figure 5:
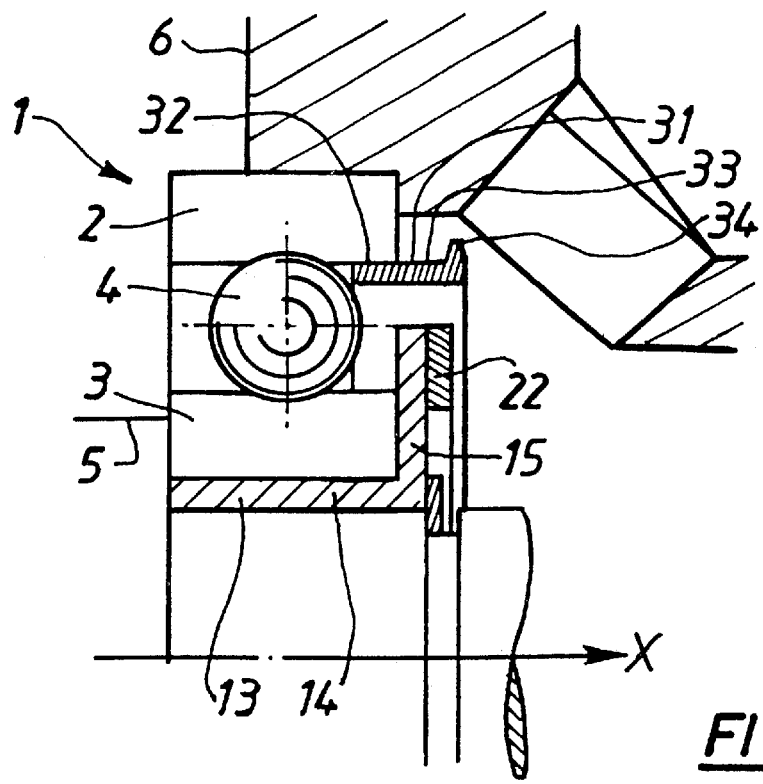
FIG. 5 is a view similar to FIG. 3, where the ring is provided with a lip that forms a ratchet means for the sensor.
Figure 6:
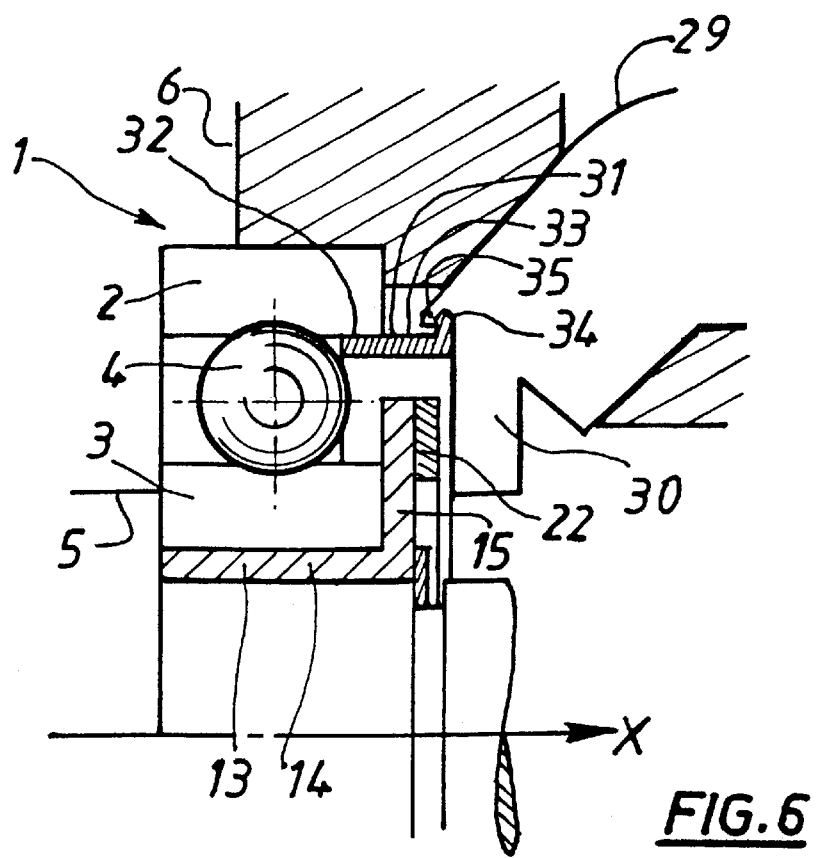
FIG. 6 is a view similar to FIG. 5, where the sensor is represented.
Figure 7:
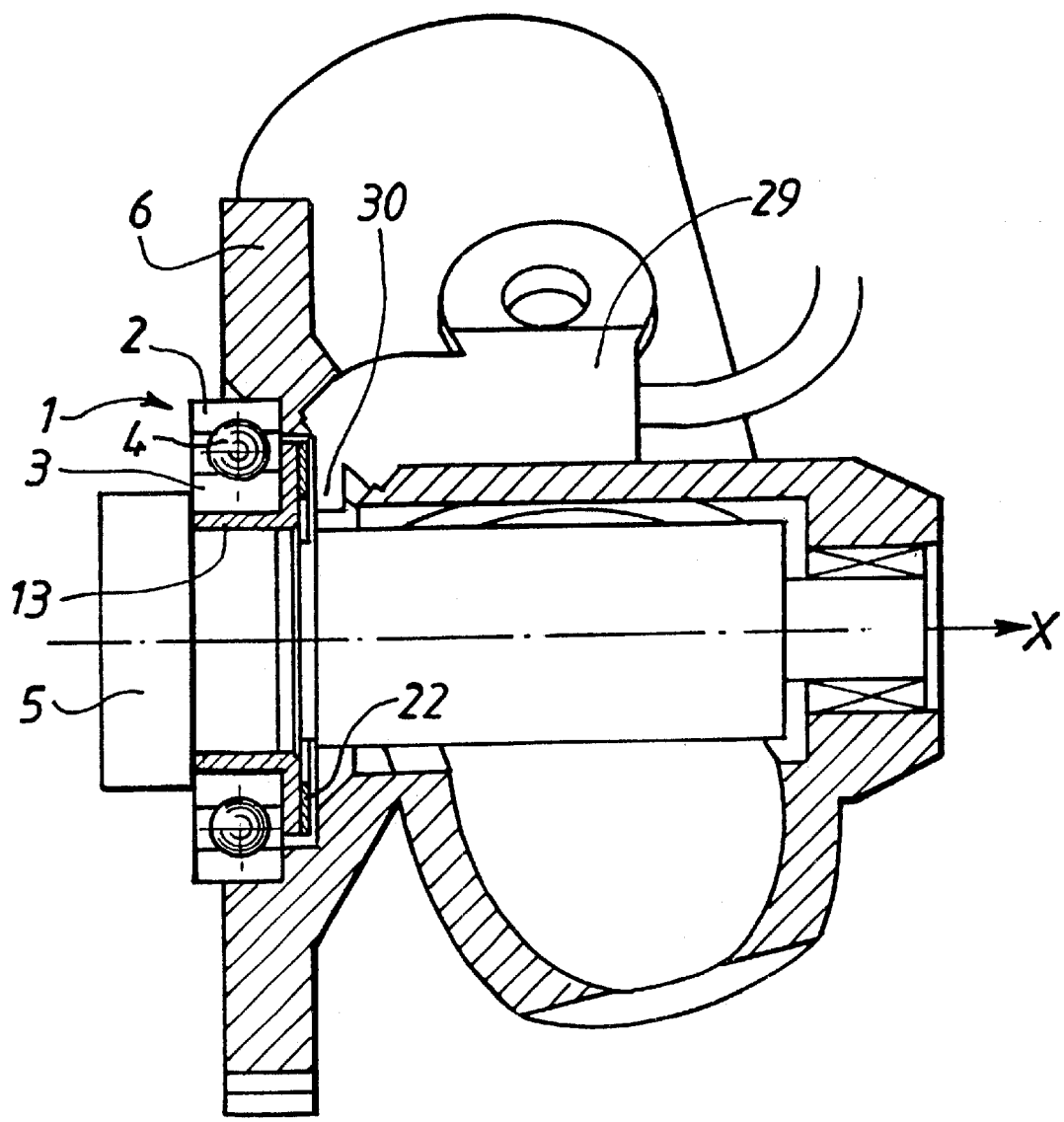
FIG. 7 is a partial cross section of a bearing according to the invention applied to a rack and pinion gearbox of a vehicle steering system.

In another mode of embodiment illustrated in FIG. 2, second frame 36 is provided connected to outer ring 2 of bearing 1, comprising cylindrical axial section 37 and annular radial section 38 that projects inward. Axial section 37 includes outer face 39, inner face 40, and open axial end 41, while the radial section includes front wall 42 and back wall 43, as well as open circumference 44. This second frame 36 may be fitted onto receptacle 27 of casing 6, the shape of receptacle 27 matching second frame 36, front wall 42 of radial section 38 thus resting against support face 28 of receptacle 27. The attachment of second frame 36 to outer ring 2 of the bearing includes a step of fitting second frame 36 onto outer ring 2 so that outer surface 10 of outer ring 2 engages the inner surface 40 of axial section 37. Once this attachment is made, outer wall 43 of radial section 38 of frame 36 rests against front face 11 of outer ring 2 of bearing 1.

In a manner similar to first frame 13, in order to prevent outer ring 2 from becoming disconnected from frame 36 during use, the attachment may include a crimping step that consists of bending axial end 41 of the frame inward at a plurality of points, for example at three points 120° apart from one another. Instead of or in addition to a crimping step, gluing or welding of second frame 36 to outer ring 2 may be used. In this variant, sensor 29 is provided to be attached by screws, ratcheting, or the like to second frame 36, for example against front wall 42 of radial section 38, so that reading component 30 is positioned opposite encoder 22 with a gap between them.

Although the above description has been made on the basis of bearing 1 with inner rotating ring 3 and outer fixed ring 2, the invention also applies to a bearing 1 which the inner ring is fixed and the outer ring turns. In that case, encoder 22 may be attached by casting in a working mold or the like to second frame 36 in the manner described above, while sensor 29 may be attached to first frame 13 as described above, or directly on the fixed body.

The present invention may further be provided with watertight means or means to support watertight means. The rotating ring of the bearing may be connected to the frame by fitting it onto it by force and/or by crimping, ratcheting, gluing, welding, or the like. The frame may be made of a ferromagnetic material; and, for example, it may be made by bending sheet metal at a right angle. If desired, one axial dimension of the axial section of the frame may be roughly equal to one axial dimension of the rotating ring of the bearing, while one radial dimension of the radial section of the frame is roughly greater than one radial dimension of the rotating ring.

According to one construction, the encoder may be an annular piece made of a synthetic material charged with particles of ferrite, and composed of a plurality of contiguous fields with inverted magnetic direction of a given field in relation to the two fields contiguous to it. The encoder may be attached to the frame by casting it into a working mold. For example, the encoder may extend over one face of the radial section of the frame, opposite the rotating ring.

The bearing may include integrated means to position a sensor, which is present in the form of a device to detect the impulses generated by the encoder, such means being carried on the fixed ring. For example, the means to position the sensor may be in the form of a ring fitted onto the fixed ring of the bearing. Such means to position the sensor may include sensor support means and/or sensor ratcheting means. The bearing may also include a sensor connected to the fixed ring by means of a second frame that constitutes, on the one hand, means to support the sensor and, on the other, a rigid connection means between the fixed ring and the fixed body.

The sensor includes at least one reading element, for example a plurality of reading elements in a line, placed opposite the encoder, chosen from among the group comprising Hall-effect probes and magnetic resistances, one application of the invention is a vehicle steering system that comprises a steering shaft, steering column, and possibly a rack and pinion gearbox, and a bearing or an assembly as described above inserted between the steering shaft and the steering column, or between the steering shaft and the gearbox.

Having described the invention, what is claimed is:

1. A bearing with a built-in encoder comprising:
    a fixed ring;
    a rotating ring designed to be mounted on a rotating body;
    rolling elements between the fixed ring and the rotating ring;
    an encoder in the form of an annular means to generate electromagnetic impulses; and
    a frame forming, on the one hand, a support for the encoder and, on the other hand, a rigid connecting means between the rotating body and the rotating ring, the rotating ring fitting onto the connecting means, which is designed to be inserted between the rotating body and the rotating ring, the frame being made by bending sheet metal at a right angle.

2. A bearing according to claim 1, wherein the frame comprises a cylindrical axial section and an annular radial section, the rotating ring fitting onto the axial section which itself is designed to fit onto the rotating body, the rotating ring resting against the radial section, to which the rotating ring is attached opposite the encoder.

3. A bearing according to claim 2 wherein one axial dimension of the axial section of the frame is roughly equal to one axial dimension of the rotating ring of the bearing.

4. A bearing according to claim 2, characterized in that one radial dimension of the radial section of the frame is roughly greater than one radial dimension of the rotating ring.

5. A bearing according to claim 2, wherein the encoder extends over one wall of the radial section of the frame, opposite the rotating ring.

6. A bearing according to claim 1, wherein the rotating ring on the bearing is connected to the frame by fitting the rotating ring onto the frame by force.

7. A bearing according to claim 1, wherein the rotating ring is connected to the frame by crimping, ratcheting, gluing, or welding.

8. A bearing according to claim 1, wherein the frame is made of a ferromagnetic material.

9. A bearing according to claim 1, wherein the encoder is an annular component made of a synthetic material charged with particles of ferrite, and composed of a plurality of contiguous fields with an inverted magnetic direction of a given field in relation to the two fields contiguous to it.

10. A bearing according to claim 1, wherein the encoder is attached to the frame by casting it into a working mold.

11. A bearing according to claim 1, further comprising a sensor in the form of a device to detect the impulses generated by the encoder, and integrated means to support the sensor.

12. A bearing according to claim 11, wherein the sensor is joined to the fixed ring by means of a second frame forming on the one hand the means to support the sensor and on the other the means for rigid connection between the fixed ring and the fixed body.

13. A combination of a bearing with a built-in encoder and a sensor, the combination comprising:
    a bearing with a built-in encoder including a fixed ring, a rotating ring designed to be mounted on a rotating body, rolling elements between the fixed ring and the rotating ring, an encoder in the form of an annular means to generate electromagnetic impulses, and a frame forming, on the one hand, a support for the encoder and, on the other hand, a rigid connecting means between the rotating body and the rotating ring, the rotating ring fitting onto the connecting means, which is designed to be inserted between the rotating body and the rotating ring, the frame being made by bending sheet metal at a right angle; and
    a sensor in the form of a device to detect impulses generated by the encoder, the sensor being structurally separate from the bearing.

14. A bearing according to claim 13, further comprising integrated means carried on the fixed ring to position the sensor.

15. A bearing according to claim 14, wherein the integrated means to position the sensor is in the form of a ring fitted onto the fixed ring of the bearing.

16. A bearing according to claim 14, wherein the integrated means to position the sensor includes means to support the sensor.

17. A bearing according to one of claim 13, wherein the sensor includes at least one reading element positioned opposite the encoder, the reading element chosen from among the group comprising Hall-effect probes, and magnetic resistances.

18. A combination of a bearing with a built-in encoder and a sensor, the combination comprising:
    a bearing including a fixed ring, a rotating ring designed to be mounted on a rotating body, rolling elements between the fixed ring and the rotating ring, an encoder in the form of an annular means to generate electromagnetic impulses, and a frame forming, on the one hand, a support for the encoder and, on the other hand, a rigid connecting means between the rotating body and the rotating ring, the rotating ring fitting onto the connecting means, which is designed to be inserted between the rotating body and the rotating ring;
    a sensor in the form of a device to detect impulses generated by the encoder, the sensor being structurally separate from the bearing; and
    integrated means carried on the fixed ring to position the sensor and including ratcheting means to ratchet the sensor.

19. A bearing with a built-in encoder comprising:
    a fixed ring;
    a rotating ring designed to be mounted on a rotating body;
    rolling elements between the fixed ring and the rotating ring;
    an encoder in the form of an annular means to generate electromagnetic impulses;
    a frame forming, on the one hand, a support for the encoder and, on the other hand, a rigid connecting means between the rotating body and the rotating ring, the rotating ring fitting onto the connecting means, which is designed to be inserted between the rotating body and the rotating ring, the second frame includes a cylindrical axial section and an annular radial section, the axial section being, on the one hand, fitted onto fixed ring and, on the other hand, designed to be fitted onto the fixed body, the fixed ring resting against the radial section to which it is attached facing the sensor; and a sensor in the form of a device to detect the impulses generated by the encoder joined to the fixed ring by means of a second frame forming on the one hand means to support the sensor and on the other the means for rigid connection between the fixed ring and the fixed body.

20. A bearing according to claim 19, wherein the second frame is joined to the fixed ring by forcibly fitting it onto it.

21. A bearing according to claim 19, wherein the second frame is joined to the fixed ring by crimping, ratcheting, gluing, or welding.

22. An assembly comprising:

a bearing including a fixed ring, a rotating ring designed to be mounted on a rotating body, rolling elements between the fixed ring and the rotating ring, an encoder in the form of an annular means to generate electromagnetic impulses, and a frame forming, on the one hand, a support for the encoder and, on the other hand, a rigid connecting means between the rotating body and the rotating ring, the frame being made by bending sheet metal at a right angle, the rotating ring fitting onto the connecting means, which is designed to be inserted between the rotating body and the rotating ring; and a sensor in the form of a device to detect impulses generated by the encoder, the sensor being carried on a fixed body.

23. An assembly according to claim 22, further comprising integrated means carried on the fixed ring to position and support the sensor.

24. An assembly according to claim 22, wherein the sensor includes at least one reading element positioned opposite the encoder and chosen from among the group that includes Hall-effect probes and magnetic resistances.

25. An assembly according to claim 22, further comprising a steering shaft, a steering column, and a portion of a rack and pinion gearbox.

26. An assembly comprising:

a bearing including a fixed ring, a rotating ring designed to be mounted on a rotating body, rolling elements between the fixed ring and the rotating ring, an encoder in the form of an annular means to generate electromagnetic impulses, and a frame forming, on the one hand, a support for the encoder and, on the other hand, a rigid connecting means between the rotating body and the rotating ring, the rotating ring fitting onto the connecting means, which is designed to be inserted between the rotating body and the rotating ring; and a sensor in the form of a device to detect impulses generated by the encoder, the sensor being carried on a fixed body;

integrated means carried on the fixed ring to position the sensor; and ratchet means to ratchet the sensor.

* * * * *